2,862,946

ESTERS OF SULFENIC ACIDS AND THEIR PREPARATION

Norman Kharasch, Culver City, Calif., assignor to Stauffer Chemical Company, a corporation of Delaware No Drawing. Application April 2, 1956
Serial No. 575,356

18 Claims. (Cl. 260—456)

This is a continuation-in-part of application Serial No. 434,343, filed June 3, 1954, now abandoned.

This invention relates to certain novel esters of sulfenic acids and their preparation.

While a few esters of sulfenic acid have been prepared by the general reaction $$RSX + R'OH \rightarrow RSOR' + HX$$

where R represents any alkyl or aryl group, R'OH is any alcohol, and X is a halogen, e. g., chlorine and bromine, this reaction proceeds with difficulty, if at all. For example, even in rigorously dry alcohol, in many cases, the disulfides are the major product. With methanol, for instance, an 80–90% yield of disulfide is obtained when reacted with p-chlorobenzenesulfenyl chloride. Also, 2-nitrobenzenesulfenyl chloride on alcoholysis gives such products as 2-nitrophenyl-2'-nitrobenzenethiolsulfonate, 2-nitrobenzenesulfinic acid and the disulfide. 2,4-dinitrobenzenesulfenyl chloride reacts with dry methanol or ethanol to give reasonable yields of the ester, but with a tertiary alkyl alcohol no ester at all was obtained.

I have found that arylsulfenyl chlorides and alkylsulfenyl chlorides react smoothly with an alcohol in the presence of a tertiary amine to give the corresponding sulfenates in high yields. That tertiary amines are effective in activating this reaction was surprising since it had been earlier reported by M. L. Moore and T. B. Johnson (J. Am. Chem. Soc., 57, 1517, 1935) that sulfenyl halides react with dry pyridine to form disulfides. The use of tertiary amines was found to be very general and applicable in this reaction to a wide variety of alcohols. It is essential for the preparation of sulfenates of tertiary alcohols which can be reacted in high yield by this method.

Pyridine is particularly effective, while acridine and triethylamine also give excellent yields. The presence of tertiary amine should be present in substantial amount and I prefer to use at least about one molecular equivalent to ensure that the reaction proceeds satisfactorily. An excess of tertiary amine is neither a detriment nor an advantage. If wet reagents are used, the esters are obtained in somewhat reduced yield.

The sulfenate esters of the present invention are useful in many different applications. For example, the tertiary alkyl 2,4-dinitrobenzenesulfenates are particularly useful as inhibitors for the stabilization of vinyl monomers. They have the property of decomposing in the range of 100–125° C., with a resulting change in inhibitory power. This is useful where it is desired to leave the inhibitor in the monomer during polymerization and yet protect the monomer prior to polymerization.

The various sulfenate esters are also useful chemical intermediates. For example, heating methyl 2,4-dinitrobenzenesulfenate with aqueous hydrochloric acid gives 2-amino-4-nitrobenzenesulfonic acid, a useful dye intermediate. The alkyl trichloromethanesulfenates can be oxidized in stages to alkyl trichloromethanesulfenates and alkyl trichloromethanesulfonates which have heretofore been unobtainable by conventional methods.

The esters of trichloromethanesulfenic acid, listed in Table II, also have various other uses, e. g., they are particularly effective in the formulation of pesticide compositions, for herbicidal and fungicidal applications, the esters being active herbicides and fungicides.

The esters of trichloromethanesulfenic acid are generally sufficiently stable to distill at low or somewhat reduced pressures. However, when the esters are heated to a temperature approaching their normal boiling points, the esters decompose in a free-radical manner and, under certain conditions, have been found to be highly explosive. In this respect, they are akin to peroxides (RSOR' vs. ROOR'). Because of these properties, the alkyl and substituted alkyl trichloromethanesulfenates are useful for initiating and modifying the course of vinyl polymerizations.

The pharmaceutical properties of sterol derivatives such as the testosterones, are well-known; and it is also known that various derivatives of these substances are physiologically potent. The sulfenate esters derived from the sterols are also useful chemotherapeutic agents.

The long chain alkyl esters, such as the octadecyl esters, have properties which make them useful in the formulation of waxes and in paper formulations where their fungicidal properties are also useful.

Other esters of trichloromethanesulfenic acid are valuable in improving the ignition qualities of diesel oil and as lubricating oil additives.

To illustrate preparation of materials involving the present invention, the following operation is set forth:

To a dry 50-ml. Erlenmeyer flask, there was added 10 ml. of ethylene chloride and 1.0 g. of 2,4-dinitrobenzenesulfenyl chloride. The mixture was swirled and heated gently to effect solution; then the alcohol (1 ml. of liquid or 1 g. of solid) was added, the flask again swirled, and 1 ml. of pyridine added. A distinct deepening of the yellow color was generally observed as the pyridine dissolved in the solution; and, in some cases, a white, needle-like precipitate (probably pyridine hydrochloride) was noted. The reaction appears to be complete immediately after adding the pyridine (negative test with starch-iodide paper or solution); but the reaction mixture was swirled and let stand 15–30 minutes to assure precipitation of any insoluble residue which may have formed. The mixture was filtered, and the residue washed on the filter plate with a few ml. of hot ethylene chloride. The bright yellow residue, the amount of which varied with the alcohol used and being from 0–15% of the total weight of sulfenate ester obtained, was discarded; the filtrate was aspirated to dryness with a water-pump at room temperature. The residue from the filtrate was extracted with three to five 10 ml. portions of cold water, and the crude sulfenate ester collected and air-dried on the suction filter plate. After further drying in the vacuum desiccator (charged with calcium sulfate), or in the heating pistol at 56° (acetone), the crude products were recrystallized from hot absolute ethanol; or, in some cases, from alcohol-benzene mixtures. If the crude products were washed well and dried, the melting points were generally within a few degrees of the purified samples. The results obtained by this method are given in Table I with respect to various typical aryl compounds embodying the present invention. In the main, these examples represent esters of 2,4-dinitrobenzenesulfenic acid.

The alkyl esters set forth in Table II were prepared by the method set forth above, but the compounds were purified by distillation rather than by a crystallization technique as in the case of the aryl compounds.

In the case of the trichloromethanesulfenates, the reaction mixture was generally allowed to stand for several hours or over-night, to ensure completeness of reaction. An example is as follows: One mole, 186 g., of trichloromethanesulfenyl chloride was dissolved in 300 ml. of dry ethylene chloride. One mole (94.5 g.) of 1-chloro-2-propanol was then added during a period of a few minutes, with stirring, followed by 1.1 mole of dry pyridine in 50 ml. of ethylene chloride. The reaction mixture was stirred, then let stand for twelve hours, at which time the mixture gave a negative test potassium iodide-starch paper. This was then extracted with two portions, 200 ml. each, of water, to remove pyridine hydrochloride and excess pyridine. The residue was dried over anhydrous sodium sulfate, and then distilled, to give the product, in 57% yield, pure, B. P. 79–80° at 0.1 mm. mercury pressure. The product was analyzed for elementary composition, as shown in the footnote to Table II.

*Table I*

| Ester [1] | Yield, percent | M. P., °C. | Carbon found | Hydrogen found |
|---|---|---|---|---|
| Methyl | 95 | 122–123 | | |
| Ethyl | 85 | 124–125 | | |
| n-Propyl | 85 | 75–76 | 41.84 | 3.87 |
| Isopropyl | 90 | 77–78 | 41.93 | 4.16 |
| n-Butyl | 85 | 53–54 | 44.32 | 4.77 |
| s-Butyl | 80 | 71–72 | 43.77 | 4.22 |
| t-Butyl | 80 | 118–119 | 44.39 | 4.45 |
| Trichloromethyl-dimethyl-methyl | 75 | | 32.20 | 2.66 |
| n-Amyl | 85 | 31–32 | 45.98 | 5.01 |
| Isoamyl | 85 | 56–57 | 46.18 | 5.23 |
| t-Amyl | 85 | 102–103 | 46.18 | 4.78 |
| n-Octyl | 90 | 57–58 | 51.21 | 6.20 |
| Lauryl | 85 | 73–74 | 55.88 | 7.01 |
| Cyclohexyl | 85 | 133–134 | 48.37 | 4.79 |
| Octadecyl | 90 | 98–99 | | |
| l-menthyl | 85 | 99–100 | 54.33 | 6.21 |
| Benzyl | 95 | 142–143 | 51.13 | 3.41 |
| Ethylene glycol monoester | 75 | 113.5–114 | 36.77 | 3.18 |
| Ethylene glycol diester | 91 | 170–171.5 | 36.71 | 2.20 |
| Pinacol (diester) | 33 | 133.5–135 | 42.50 | 3.53 |
| Alpha-phenylethyl | 93 | 92–93 | 52.59 | 3.77 |
| Allyl | 14 | 86–87 | 42.28 | 3.28 |
| Cinnamyl | 35 | 120–123 | 54.41 | 3.79 |
| Benzhydryl | 29 | 113 | 60.31 | 3.97 |
| t-Butyl-2-nitrobenzenesulfenate | 80 | 53 | 53.20 | 5.48 |
| Phenyl | 70 | 122–124 | 49.6 | 3.01 |
| 19-nortestosteronyl | 70 | 199–200 | 60.71 | 5.78 |
| Testosteronyl | 66 | 204.5–205.5 | 61.91 | 5.84 |
| 17-methyl testosteronyl | 70 | 170–171 | 62.65 | 6.56 |
| Methyl 12-nitrobenzenesulfenate | 80 | 51–52 | | |
| N,n-dimethylaminoethyl | 90 | 73–74 | 42.20 | 4.65 |

[1] Of 2,4-dinitrobenzene sulfenic acid unless otherwise stated.

*Table II*

| Ester [1] | Yield [2] | Boiling point/mm. | $n_D^{20}$ |
|---|---|---|---|
| Methyl | 77 | 53.5–54°/14 mm | 1.5050 |
| Beta-chloroethyl | 60 | 52–53°/0.2 mm | 1.5223 |
| n-Propyl | 52 | 31–32°/0.3 mm | 1.4800 |
| Isopropyl | 41 | 32–33°/0.4 mm | 1.4820 |
| t-Butyl | 27 | 40.0–40.5°/0.2 mm | 1.4918 |
| Allyl [3] | 55 | 52–53°/0.15 mm | 1.5413 |
| Beta-methoxyethyl | 62 | 47–47.5°/0.2 mm | 1.4937 |
| Beta-phenoxyethyl | 56 | 78–80°/0.3 mm | |
| Tetrahydrofurfuryl | 48 | 74.5–75.5°/0.2 mm | 1.5180 |
| 1-chloro-2-propyl | 54 | 47–48°/0.15 mm | 1.5106 |
| 1,3-dichloro-2-propyl [4] | 57 | 79–80°/0.1 mm | 1.5320 |

[1] Ester of trichloromethanesulfenic acid.
[2] Of pure product. Crude yields 10–20% higher.
[3] Analysis for sulfur: Found, S=15.52; theory=15.4.
[4] Analysis: Found for Cl=63.72; for carbon=17.02; for hydrogen=1.50; for sulfur=11.65. Theory: Cl=63.70; C=17.2; H=1.79; S=11.50.

I claim:
1. Chemical compounds having the formula:

$$CCl_3SOR_1$$

wherein $R_1$ is selected from the group consisting of lower alkyl, chloro-substituted lower alkyl, allyl, tetrahydrofurfuryl, beta-methoxyethyl and beta-phenoxyethyl radicals.
2. Beta-chloroethyl trichloromethanesulfenate.
3. T-butyl trichloromethanesulfenate.
4. Allyl trichloromethanesulfenate.
5. 1-chloro-2-propyl trichloromethanesulfenate.
6. 1,3-dichloro-2-propyl trichloromethanesulfenate.
7. The process of preparing an ester of sulfenic acid which comprises reacting a sulfenyl halide selected from the group consisting of an aromatic sulfenyl halide and an aliphatic sulfenyl halide with an alcohol in the presence of a tertiary amine.
8. The process of preparing esters of alkylsulfenic acids which comprises reacting an alkylsulfenyl chloride with an alcohol in the presence of a tertiary amine.
9. The process of preparing esters of alkylsulfenic acids which comprises reacting an alkylsulfenyl chloride with an alcohol in the presence of one or more molecular equivalents of a tertiary amine based on the sulfenyl chloride.
10. The process of esterification as described in claim 8 wherein the tertiary amine is pyridine.
11. The process of esterification as described in claim 8 wherein the alkylsulfenyl chloride is trichloromethanesulfenyl chloride.
12. The process of preparing an ester of a sulfenic acid which comprises reacting a sulfenyl halide with an alcohol in the presence of a tertiary amine.
13. The process of preparing an ester of a sulfenic acid which comprises reacting a sulfenyl halide selected from the group consisting of an aryl sulfenyl halide and an alkyl sulfenyl halide with an alcohol in the presence of a tertiary amine.
14. The process of preparing esters of arylsulfenic acids which comprises reacting an arylsulfenyl halide with an alcohol in the presence of a tertiary amine.
15. The process of preparing esters of arylsulfenic acids which comprises reacting an arylsulfenyl halide with an alcohol in the presence of one or more molecular equivalents of a tertiary amine based on the arysulfenyl halide.
16. The process of esterification as described in claim 15 wherein the tertiary amine is pyridine.
17. The process of esterification as described in claim 15 wherein the arylsulfenyl halide is 2,4-dinitrobenzenesulfenyl chloride and the tertiary amine is pyridine.
18. The process of esterification as described in claim 17 wherein the alcohol is tertiary-butyl alcohol.

References Cited in the file of this patent

Kharasch et al.: Chemical Reviews, vol. 39 (1946), pp. 323–327.

Perold et al.: Jour. Am. Chem. Soc., vol 73 (1951), p. 2380.